(12) United States Patent
Junk

(10) Patent No.: US 9,335,762 B2
(45) Date of Patent: May 10, 2016

(54) EMERGENCY TEST CONTROL PANEL DEVICE, SYSTEM AND METHOD

(75) Inventor: Kenneth William Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 592 days.

(21) Appl. No.: 12/871,536

(22) Filed: Aug. 30, 2010

(65) Prior Publication Data

US 2011/0054828 A1    Mar. 3, 2011

Related U.S. Application Data

(60) Provisional application No. 61/239,593, filed on Sep. 3, 2009.

(51) Int. Cl.
  *G05B 23/00* (2006.01)
  *G05B 23/02* (2006.01)

(52) U.S. Cl.
  CPC .................................. *G05B 23/0256* (2013.01)

(58) Field of Classification Search
  CPC ........... G05B 23/0256; G05B 23/0264; G05B 23/0267; G05B 9/02; G05B 19/0428; G05B 19/41865; G05D 7/0629; F16K 37/0091; F16K 37/0083
  USPC ...................................................... 702/125
  See application file for complete search history.

(56) References Cited

U.S. PATENT DOCUMENTS

| | | | |
|---|---|---|---|
| 4,263,580 A | 4/1981 | Sato et al. | |
| 6,186,167 B1 | 2/2001 | Grumstrup et al. | |
| 6,862,547 B2 * | 3/2005 | Snowbarger et al. | 702/114 |
| 2006/0220844 A1 * | 10/2006 | Flanders | 340/540 |
| 2008/0236679 A1 * | 10/2008 | Esposito | 137/487.5 |
| 2009/0015401 A1 * | 1/2009 | Hamzy | 340/539.32 |

FOREIGN PATENT DOCUMENTS

| | | |
|---|---|---|
| JP | 2004-533681 | 11/2004 |
| JP | 2010-526988 | 8/2010 |

OTHER PUBLICATIONS

Search Report for PCT/US2010/045879, dated Dec. 21, 2010.
Written Opinion for PCT/US2010/045879, dated Dec. 21, 2010.
Office Action for Chinese Patent Application No. 201080014058.1, mailed Dec. 26, 2013.
Office Action for Japanese Patent Application No. 2012-527898, mailed May 28, 2014.

(Continued)

*Primary Examiner* — Manuel L Barbee
(74) *Attorney, Agent, or Firm* — Marshall, Gerstein & Borun LLP

(57) ABSTRACT

Embodiments disclosed herein include a test control panel device, system, computer program product, and method for receiving a test input signal; reading a duration of the test input signal; verifying that the signal duration is a valid duration to initiate the test; initiating the test by sending a start test signal to a valve controller device; receiving signals from the valve controller device; indicating that the test control panel device has received a valve controller device signal from the valve controller device; wherein the valve controller device signal is a test acknowledgement signal.

12 Claims, 7 Drawing Sheets

(56) References Cited

OTHER PUBLICATIONS

Office Action for Russian Patent Application No. 2012112042/08(018122), mailed Dec. 24, 2014.

Communication pursuant to Article 94(3) EPC issued Mar. 10, 2015 by the European Patent Office for European Application No. 10 757 653.0-1807 (3 pages).

* cited by examiner

FIG. 5

| | | Test State Indication | | | | Output indicator | | | | | | | | |
|---|---|---|---|---|---|---|---|---|---|---|---|---|---|---|
| Index | Loop Current | Tvl Set Point | Travel | DVC Startup | Green Solid | Green Fast Blink | Green Slow Blink | Red Solid | Red Fast Blink | Red Slow Blink | Yellow Solid | Y Fast Blink | Y Slow Blink | |
| 1 | Normal | Normal | Normal | Manual | ✓ | | | | | | | | | |
| 2 | Normal | Normal | Throttling | Manual | | ✓ | | | | | | | | |
| 3 | Normal | Normal | Tripped | Manual | | ✓ | | | | | ✓ | | | |
| 4 | Normal | Tripped | Normal | Manual | | | | ✓ | | | | | | |
| 5 | Normal | Tripped | Throttling | Manual | | | | | ✓ | | ✓ | | | |
| 6 | Normal | Tripped | Tripped | Manual | | | | ✓ | | | ✓ | | | |
| 7 | Normal | Normal | Normal | Auto | ✓ | | | | | | | | | |
| 8 | Normal | Normal | Throttling | Auto | | ✓ | | | | | | | | |
| 9 | Normal | Normal | Tripped | Auto | | ✓ | | ✓ | | | | | | |
| 10 | Normal | Tripped | Normal | Auto | | | | | ✓ | | ✓ | | | |
| 11 | Normal | Tripped | Throttling | Auto | | | | | ✓ | | ✓ | | | |
| 12 | Normal | Tripped | Tripped | Auto | | | | ✓ | | | ✓ | | | |

FIG. 6

| | | Test State Indication | | | | Output indicator | | | | | | | | |
|---|---|---|---|---|---|---|---|---|---|---|---|---|---|---|
| Index | Loop Current | Tvl Set Point | Travel | DVC Startup | Green Solid | Green Fast Blink | Green Slow Blink | Red Solid | Red Fast Blink | Red Slow Blink | Yellow Solid | Yellow Fast Blink | Yellow Slow Blink |
| 13 | Tripped | Normal | Normal | Manual | ✓ | | | | | | | | |
| 14 | Tripped | Normal | Throttling | Manual | | ✓ | | | | | | | |
| 15 | Tripped | Normal | Tripped | Manual | | ✓ | | ✓ | | | | | |
| 16 | Tripped | Tripped | Normal | Manual | | ✓ | | | ✓ | | | | |
| 17 | Tripped | Tripped | Throttling | Manual | | | | | ✓ | | | | |
| 18 | Tripped | Tripped | Tripped | Manual | | | | ✓ | | | | | |
| 19 | Tripped | Normal | Normal | Auto | ✓ | | | | | | | | |
| 20 | Tripped | Normal | Throttling | Auto | | ✓ | | | | | | | |
| 21 | Tripped | Normal | Tripped | Auto | | ✓ | | ✓ | | | | | |
| 22 | Tripped | Tripped | Normal | Auto | | | | | ✓ | | | | |
| 23 | Tripped | Tripped | Throttling | Auto | | | | | ✓ | | | | |
| 24 | Tripped | Tripped | Tripped | Auto | | | | ✓ | | | | | |

EMERGENCY TEST CONTROL PANEL DEVICE, SYSTEM AND METHOD

FIELD OF TECHNICAL ART

This disclosure relates to devices, systems, and methods for testing process control systems and, in particular, to devices, systems, and methods for testing an emergency shutdown system in a process plant, or for testing components of such a system in a process plant.

BACKGROUND

To maintain the safety of a process plant, a process plant may include an integrated or separately-controlled emergency shutdown system. An emergency shutdown system is intended to help contain a hazardous condition that may occur in or around a process plant. For example, some process plant systems, such as oil refineries or natural gas processing plants may require a quick shutdown if a fire were to break out in or around the process plant. An emergency shut down system may shut down the operation of the process plant by cutting off further supply of materials to the process plant. The system may take over the operation of the process plant when it detects errors or dangerous conditions existing in an area of the process plant and may shut down a main line valve that controls the supply of input materials to the process plant. The emergency shutdown system may employ a valve controller that shuts a supply valve of the process plant to prevent further flow of input material through the valve, which may prevent further flow of the material to the remainder of the process plant.

Some emergency shutdown systems may deteriorate over time and, in particular, may deteriorate to a state where the emergency shutdown system fails to operate properly. For example, in a pneumatic actuator used to close a highly-pressurized valve, dirt or other foreign materials may accumulate in the actuator or in the valve such that the actuator or the valve may fail or become stuck. Of course, if the actuator or valve that fails or becomes stuck (e.g., due to corrosion, accumulation foreign materials, etc.) the actuator or valve may not operate properly in response to a control signal.

In view of the potential for the emergency shutdown systems or components to fail at a crucial time if they are not properly tested and maintained, it is often desirable to test systems and components (e.g., valves, controllers, actuators) making up an emergency shutdown system, to ensure that the components will operate properly in an emergency. One method of testing the operation and/or response of a device to a shut down command is to issue a shut down command and determine whether the device responds to the command. In the case of an emergency shut down valve, this may include issuing a command to fully close the valve and determining whether the valve closes as expected. However, a test that involves completely closing a valve may be costly and may cause a large disturbance in the operation of the process plant.

An alternative to the complete shutdown test is to attach a bypass valve as a safety valve so that the safety valve can be fully shut down by what is referred to as a "full stroke" test without shutting down the process plant. However, there may be economic and operational problems associated with the bypass valve technique. Therefore, conventional diagnostics techniques have been developed that close a valve to be tested to a certain percentage toward a full closure of the valve. These tests are referred to as partial stroke (closure) tests.

However, problems may exist with conventional partial stroke tests. In particular, after the initiation of a conventional partial stroke test, it may take some time before a valve controller physically moves the valve off of the valve's travel stop. Some time may be required to transfer a user-initiated partial stroke test signal into a visible indication that the test is in progress. Because conventional emergency shutdown systems may not provide an immediate indication to a user that the user has initiated a partial stroke test, a user may not think the test has been initiated. Therefore, the user may try to initiate the test again by hitting a start test button for a second time in an effort to start the test while not having yet received an indication that the partial stroke test actually has been initiated. An additional problem may occur with conventional test systems if the user repeatedly hits the start test button. Because the user may not have an indication that the test system initiated his test, the user may hit a start test button again, but in actuality, the user may be turning on and off the test without the user being aware of his unintended actions.

SUMMARY

In accordance with an aspect of the invention, a test control panel device includes a test input device configured to receive a test input signal, a timer for reading a duration of the test input signal, a verification device configured to verify that the signal duration is a valid duration to initiate the test, a transmitter device configured to initiate the test by sending a start test signal to a valve controller device, a receiver device configured to receive a signal from the valve controller device, and an output indicator device configured to indicate that the test control panel device has received a valve controller device signal from the valve controller device, wherein the valve controller device signal is a test acknowledgement signal.

In accordance with an aspect of the invention, a testing system includes a test input device configured to receive a test input signal, a timer for reading a duration of the test input signal, a verification device configured to verify that the signal duration is a valid duration to initiate the test, a transmitter device configured to initiate the test by sending a start test signal to a valve controller device, a receiver device configured to receive signals from the valve controller device, and an output indicator device configured to indicate that the test control panel device has received a valve controller device signal from the valve controller device, wherein the valve controller device signal is a test acknowledgement signal.

In accordance with an aspect of the invention, a computer program product having a computer readable medium including programmed instructions for testing a system, wherein the instructions perform receiving a test input signal, reading a duration of the test input signal, verifying that the signal duration is a valid duration to initiate the test, initiating the test by sending a start test signal to a valve controller device, receiving signals from the valve controller device, and indicating that the test control panel device has received a valve controller device signal from the valve controller device, wherein the valve controller device signal is a test acknowledgement signal.

In accordance with an aspect of the invention, a test control panel device includes a test input device configured to receive a test input signal, a timer for reading a duration of the test input signal, a verification device configured to verify that the signal duration is a valid duration to initiate the test, a transmitter device configured to initiate the test by sending a start test signal to a valve controller device, a receiver device configured to receive a signal from the valve controller device, and an output indicator device configured to indicate that the test control panel device has received a valve controller device signal from the valve controller device, wherein the valve controller device signal is a test acknowledgement signal, wherein the test is a partial stroke test, wherein the valve controller device signal is any one of the group consisting of: a position sensor signal, a pressure sensor signal, or a current sensor signal or any one of the group consisting of: a loop current signal, a travel set point signal, a travel signal, or a DVC startup signal.

DRAWINGS

FIG. 5 is a table of exemplary signaling combinations including some selected signaling which may be produced by the test control panel device.

FIG. 6 is another table of exemplary signaling combinations including some selected signaling which may be produced by the test control panel device.

DESCRIPTION

Figure 1:
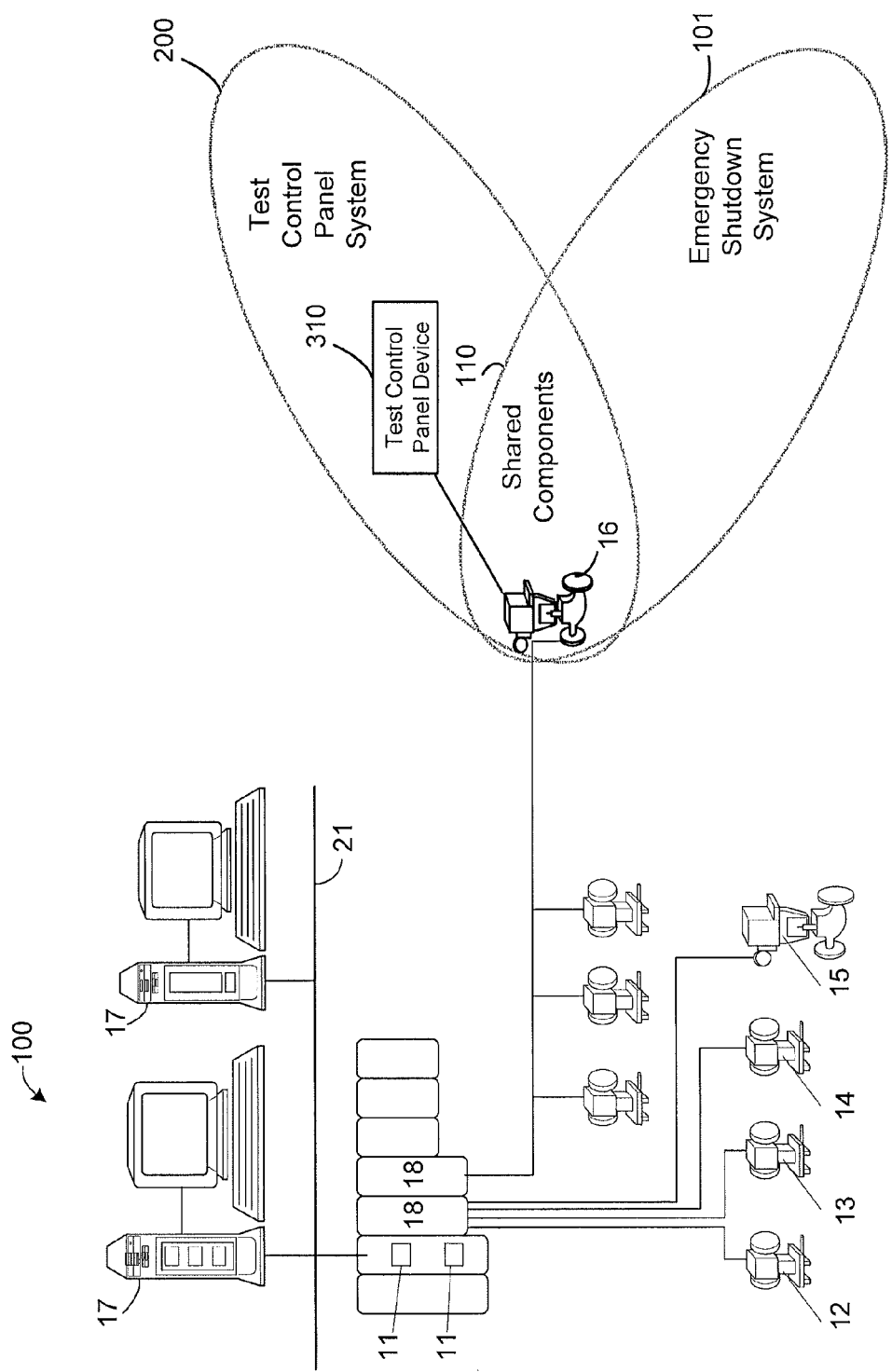
FIG. 1 is a general diagram of a process plant having an emergency shutdown system and illustrating an embodiment of a test control panel system assembled in accordance with teachings of the present invention, wherein some of the components of the test control panel system may be shared with an emergency shutdown system and/or with a process plant system.

FIG. 1 is a general diagram of a process plant 100 which may be, for example, a chemical, petroleum, or other types of process plant, and may have an emergency shutdown system 101 and a test control panel system 200. The test control panel system 200 may share some components (e.g., shared components 110) with the emergency shutdown system 101 and/or the process plant 100. The example process plant of FIG. 1 includes one or more workstations 17, one or more I/O devices 18, one or more processors 11 disposed in one or more controllers 19, and a plurality of field devices 12-15, each of which field devices may be, for example, a valve, a valve positioner/actuator, a switch, transmitter (e.g., for sensing and transmitting temperature, pressure, fluid level, flow rate, etc.), etc., and each of which field devices performs a process function such as opening or closing a valve, measuring a process parameter, etc. The workstations 17, the I/O devices 18, the controllers 19, and the field devices 12-15 cooperate to form a process control system 102 that controls the process during normal operation.

Additionally, the system 100 may include one or more field devices, such as an emergency shutdown valve 16, that are part of systems in addition to the control system 102. The emergency shutdown valve 16, for example, may also be part of the emergency shutdown system 101 and/or the test control panel system 200 (i.e., the emergency shutdown valve 16 may be one of the shared components 110). The test control panel system 200 includes, in addition to the emergency shutdown valve 16, a test control panel device 310 coupled to the emergency shutdown valve 16. Communication buses 20, which may include analog buses, digital buses, and/or combined analog and digital buses, may communicatively couple the field devices 12-15 and the emergency shutdown valve 16 to the process controllers 19.

During normal operation, the control system 102 operates the emergency shutdown valve 16. However, in the event of an emergency, the emergency shutdown system 101 operates to command the emergency shutdown valve 16 close (or open), thereby protecting the system and/or personnel in the process plant 100. Of course, the emergency shutdown system 101 may, in some embodiments, be built into the control system 102 such that the same control system 102 that operates the emergency shutdown valve 16 during normal operation also controls the emergency shutdown valve 16 during an emergent situation.

Generally, the emergency shutdown system 101 operates to minimize dangerous conditions that may occur in the process plant 100. For example, during operation, the emergency shutdown system 101 may detect a hazardous condition, and then send a signal, such as a full-scale (e.g., 20 mA in a 4-20 mA scale) or a zero-scale (e.g., 0 mA or 4 mA in a 4-20 mA scale) current, to a digital valve controller 206 to power down the digital valve controller 206. When the digital valve controller 206 is powered down the emergency control valve 16 may move to its safety condition.

As generally known by those of ordinary skill in the art, certain benefits may be achieved by testing whether components of a process plant or components of an emergency shutdown system will operate properly before a real emergency occurs. For example, testing of the emergency control valve 16 may be beneficial. Testing of other components may also be beneficial and these other components and their communications may also be included in embodiments of the test control panel system 200.

Some of the field devices 12-15 and/or the emergency shutdown valve 16 may be smart field devices, such as field devices conforming to the well-known Fieldbus protocols, (e.g., the FOUNDATION™ Fieldbus protocol), may also perform control calculations, alarming functions, and other control functions commonly implemented within the process controllers 19. The process controllers 19, which may be located within the plant environment, may receive signals indicative of process measurements made by the field devices 12-15 and the emergency shutdown valve 16, and/or may receive signals indicative of other information pertaining to the field devices 12-15 and the emergency shutdown valve 16. The process controllers 19 may execute (e.g., on the processors 11) a controller application that runs, for example, different control modules which make process control decisions, generate control signals based on the received information and coordinate with the control modules or blocks being executed in the field devices, such as HART and Fieldbus field devices. The control modules in the process controller 19 may send the control signals over the buses 20 to the field devices 12-15 and/or the emergency shutdown valve 16 to thereby control the operation of the process.

A network connection 21 may facilitate sharing of information from the field devices 12-15, the emergency shutdown system 101, the test control panel system 200, and the controllers 19 with one or more other hardware and/or software devices, such as the workstations 17, other personal computers (not shown), one or more data historians (not shown), one or more report generators (not shown), one or more centralized databases (not shown), etc. The workstations 17 (and other hardware connected via the network connection 21) typically reside in control rooms or other locations away from the harsher environment of the process plant 100, but are nevertheless generally considered part of the process plant 100. The network connection 21 may also facilitate sharing of information (e.g., process control data from the field devices 12-15, the emergency shutdown valve 16, the controllers 19, etc.) with other hardware and/or software devices and systems, such as the test control panel system 200 or the test control panel device 310 in the test control panel system 200.

These hardware and/or software devices and, in particular, the workstations 17, execute applications that may, for example, enable an operator to perform functions with respect to the process, such as changing settings of the process control routine, modifying the operation of the control modules within the controllers 19, the field devices 12-15, and/or the emergency shutdown valve 16, viewing the current state of the process, viewing alarms generated (e.g., by the field devices 12-15, the emergency shutdown valve 16, the controllers 19, etc.), simulating the operation of the process for the purpose of training personnel, testing the process control software (or running other tests), keeping and updating a configuration database, etc.

One example of software that may run on the workstations 17 and/or the controllers 19 is the DeltaV™ control system, sold by Emerson Process Management, and includes multiple applications stored within and executed by different devices located at diverse places within the process plant 100 (e.g., within the controllers 19, the I/O devices 18, the workstations 17, etc.). A configuration application, which resides in one or more of the operator workstations 17, enables users to create or change process control modules and download these process control modules via the network connection 21 to the process controllers 19. Typically, these control modules are made up of communicatively interconnected function blocks, which function blocks are objects in an object-oriented programming protocol and perform functions within the control scheme based on inputs to the controllers 19 from the field devices 12-15 (and the emergency shutdown valve 16). The control modules may also provide outputs to other function blocks within the control scheme. A configuration application or a test application may also allow a designer to create or change operator interfaces or human-machine interfaces (HMIs) which a viewing application uses to display data to an operator and to enable the operator to change settings, such as set points, or test data, within the process control routine or to run tests.

Each of the process controllers 19 and, in some cases, the field devices 12-15 and/or the emergency shutdown valve 16, may store and execute an application that runs the respective modules to implement actual process control functionality or test functionality. One or more workstations 17, may run a viewing application, may receive data from the controller application or from a test application via the network connection 21, may display the received data to process control system designers, operators, or users using the user interfaces, and may provide any of a number of different views, such as an operator's view, an engineer's view, a technician's view, etc.

The process plant 100 illustrated in FIG. 1 employs the emergency shutdown system 101 to take over control of the components of the process plant 100 if the emergency shutdown system 101 detects a hazardous condition, such as a fire, a high pressure indication, etc. The emergency shutdown system 101 may, for example, send a signal to the emergency shutdown valve 16 to perform an action (such as closing or opening the valve) to achieve a safety condition. Of course, while the embodiments described herein contemplate a scenario where the safety condition of the emergency shutdown valve 16 is a closed position, the safety condition of the emergency shutdown valve 16 may be an open position, a closed position, or a partially open/closed position, depending on the particular application and/or process.

Figure 2:
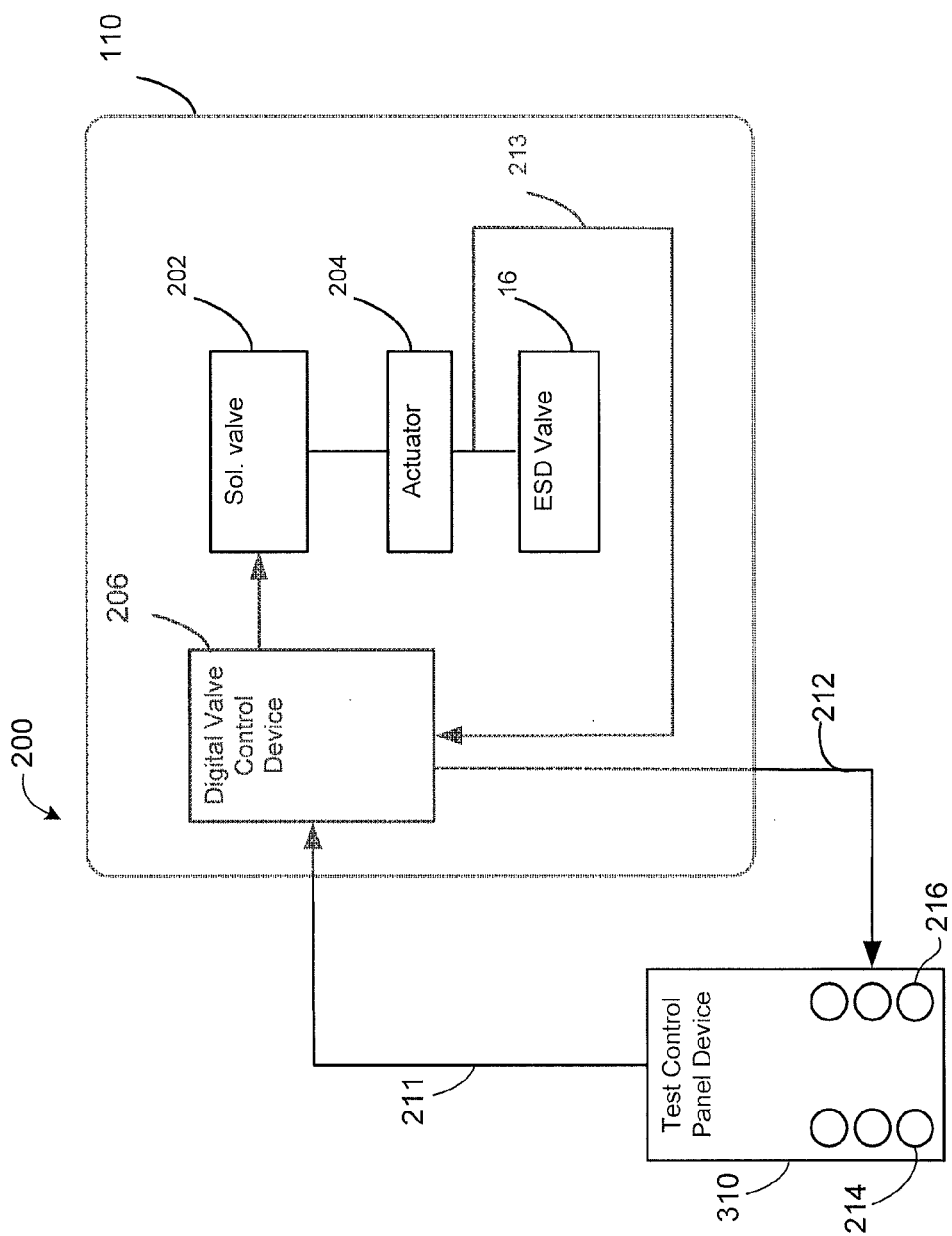
FIG. 2 is an embodiment of a test control panel system that may include a test control panel device along with a digital valve controller and/or other shared components which may also be part of the emergency shutdown system or the process plant system of FIG. 1.

FIG. 2 illustrates an embodiment of the test control panel system 200. The test control panel system 200 may include the test control panel device 310, one or more communication links 211, 212, a test input signal 214, an output indicator 216, and various components 210, include the emergency shutdown valve 16, a digital valve controller 206, a solenoid valve 202, and a valve actuator 204. Some of all of the components 210 may be shared components 110 that also operate under the process control system 102. The test control panel system 200 may also include various signals, such as a feedback signal 213, between one or more of the components 210.

The test control panel system 200 may test one or more components to verify that the device is operative to perform its safety function in the event of an emergency. For example, the test control panel system 200 may test the emergency control valve 16 by running a partial stroke test to verify that the emergency control valve 16 operates properly (e.g., closes, opens, moves smoothly and/or at the correct speed, etc.). Of course, other components may be included in, or tested by, the emergency shutdown system 200, including any of the components described in U.S. Pat. Nos. 6,862,547 and 6,186,167, each of which is hereby incorporated by reference in its entirety.

Some conventional test systems exhibit characteristics that make their use problematic. In particular, in some partial stroke test systems a significant time delay may exist between the time when a user initiates a partial stroke test and the time at which the valve controller physically moves the emergency control valve off of its travel stop. Even in systems in which an indicator informs the user that the system has initiated a partial stroke test, the indicator often operates according a switch located on the travel stop. Thus, in such systems, the same significant time delay may exist.

Significant time delays between the initiation of a test and the visible indication that the test is running may cause a user to believe that initiation of the test was unsuccessful. As a result, the user may re-try to initiate the test (e.g., by pressing a "start test" button again) in an effort to start the test. In some instances, the repeated pressing of a start button creates a problem in that it instructs the system to cancel the test which, unbeknownst to the user, the user already initiated successfully.

The presently-described test control panel system 200 provides a solution to this problem by including a test response signal which indicates to the user that the user has successfully initiated the test (e.g., the partial stroke test). For example, a test control panel system 200 may automatically run a partial stroke test based upon the requirements of the particular process plant 100 or embodiments of the test control panel system 200, which may also allow for a manual initiation of a test. For example, the embodiment of the test control panel system 200 may produce a test response signal to respond to a test being initiated by a user.

Alternative tests that can be run with the test control panel device 310 of test control panel system 200 include a test which may be run to test any particular component of an emergency shutdown system 101, such as a test that checks if a shaft is broken, a test that checks for actuator damage, a valve is stuck, etc. or a test that checks for a plurality of components operating together properly, etc.

As illustrated in FIG. 2, the test control panel system 200 includes the test control panel device 310 and the digital valve controller 206. The test control panel device 310 and the digital valve controller 206 may communicate with each other via communication links 211, 212, which may be wired or wireless links, or may be one link or multiple links. Additionally, the test control panel device 310 and the digital valve controller 206 may communicate with any component used in the particular test run by the test control panel system 200 (e.g., the solenoid valve 202, the actuator 204, etc.). As illustrated, the test control panel device 310 may communicate to and from the digital valve controller 206 to send and receive diagnostic test information regarding the test initiated by the test control panel device 310.

The user may initiate a partial stroke test (or other test) by mechanically moving a switch, such as a button, or the control system 102 or the emergency shutdown system 101 may be programmed to automatically initiate a partial stroke test (or other test) at a periodic time interval or based on some other criterion. FIG. 2 illustrates an embodiment in which a "start" button 215 on the test control panel device 310 operates to send a test input signal to the digital valve controller 206, which test input signal indicates that the digital valve controller device 206 should perform a partial stroke test. The test control panel device 310 may also include a test input signal 214 for indicating the test control panel device 310 is outputting the test input signal to the digital valve controller 206.

During the partial stroke test, the digital valve controller 206 controls the functionality of any of the components 210 involved in the test (e.g., the emergency shutdown valve 16, the solenoid valve 202, and the actuator 204) by sending a test signal to the device. After the digital valve controller 206 receives an input and determined to be a test signal instructing the controller to execute a partial stroke test (e.g., a signal from the test control panel device 310), the digital valve controller 206 may proceed with the partial stroke test by retrieving a configurable script or routine. During operation of the partial stroke test, the digital valve controller 206 may continue to monitor other inputs, such as an abort signal used to indicate a real emergency and override any current testing. However, in the absence of an abort signal, the digital valve controller 206 may send a signal to the solenoid valve 202, which solenoid valve 202 may adjust the pneumatic pressure in the actuator 204 by directing the pressure to the valve actuator 204 or to an exhaust valve (not shown). Accordingly, the actuator 204 moves the emergency shutdown valve 16.

For example, the embodiment of FIG. 2 illustrates the digital valve controller 206 configured to send a pneumatic signal to a solenoid valve 202. The solenoid valve 202 may include a solenoid control which may receive direct current (DC) power and electrical control signals from other components of the power plant or emergency shutdown system 101. The controller of the solenoid valve 202 is configured to send a signal to control the pressure output of the solenoid valve. The solenoid valve 202 may send a pneumatic signal to the actuator 204, which causes the actuator 204 to send an electronic signal to move a plug of the emergency control valve 16 as part of the partial stroke test. For example, the actuator may ramp the valve 16 from the normal 100 percent open position to a partially closed position and then back again to its normal state.

The feedback signal 213 may originate at any of the components 210 involved in the partial stroke test. For example, any of the solenoid valve 202, the actuator 204, or the emergency shutdown valve 16 (or other sensors disposed among or associated with the components 210) may provide the feedback signal 213 to the digital valve controller 206, which may send a feedback signal (e.g., via communication link 212) to the test control panel device 310. Alternatively, the digital valve controller 206 may, upon receiving the test signal and initiating the partial stroke test, transmit a feedback signal directly to the test control panel device 310 via, for instance, the communication link 212. The test control panel device 310 may indicate to the user that the user has successfully initiated the partial stroke test by illuminating the indicator 216.

A feedback signal may be obtained at any point toward the completion of the signaling to initiate the partial stroke test of the emergency control valve 16. The feedback signal 213 may be obtained from any of the devices involved in the partial stroke test. For example, an electronic feedback signal 213 may be a travel feedback signal obtained from the actuator 204. Other examples of where a feedback signal may be obtained include the solenoid valve 202, or the valve 16, etc.

For example, the test control panel devices 310A, 310B include three light output indicators 216A-C as the embodiment of an overall output indicator device 32. For example, one fast blinking green light output indicator 216A may indicate that the test control panel device 310a received an acknowledgement response from the digital valve controller 206 in response to a start partial stroke test signal that was sent from the test control panel device 310a.

Figure 3A:
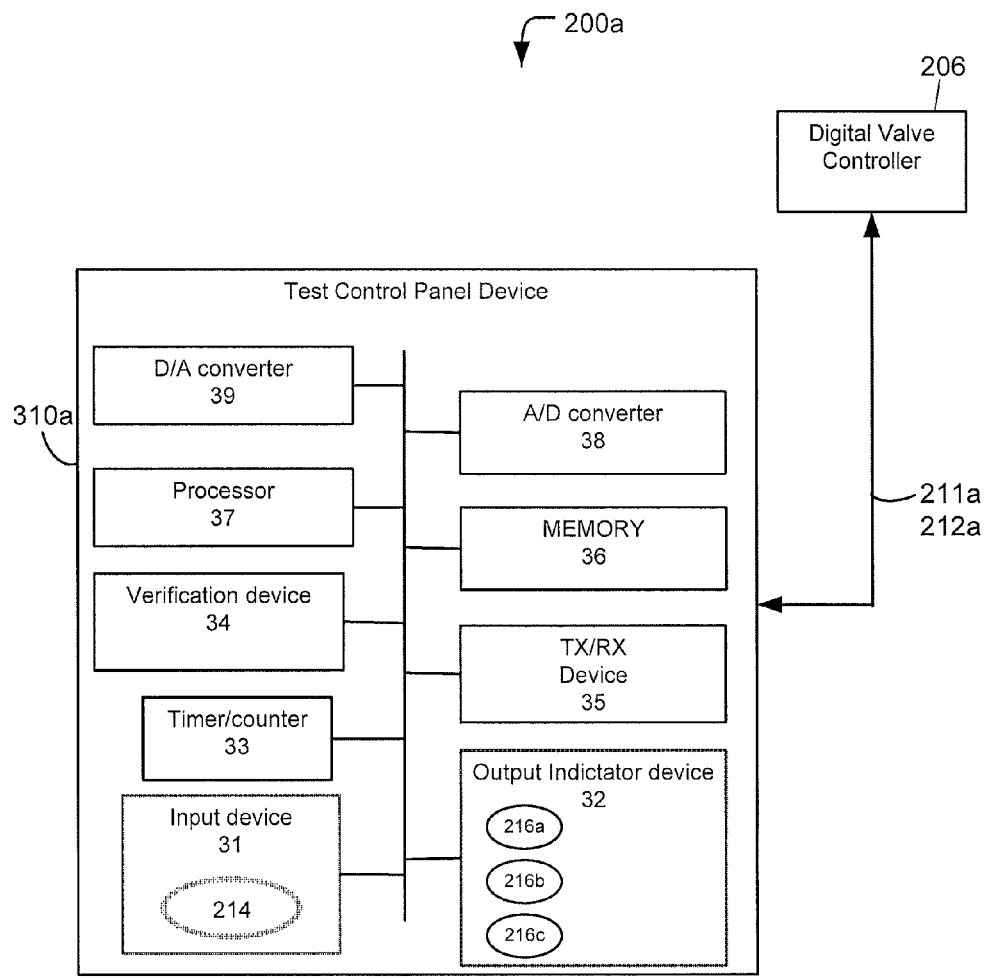
FIG. 3A is an embodiment of a test control panel device that may communicate with a digital valve controller.
Figure 3B:
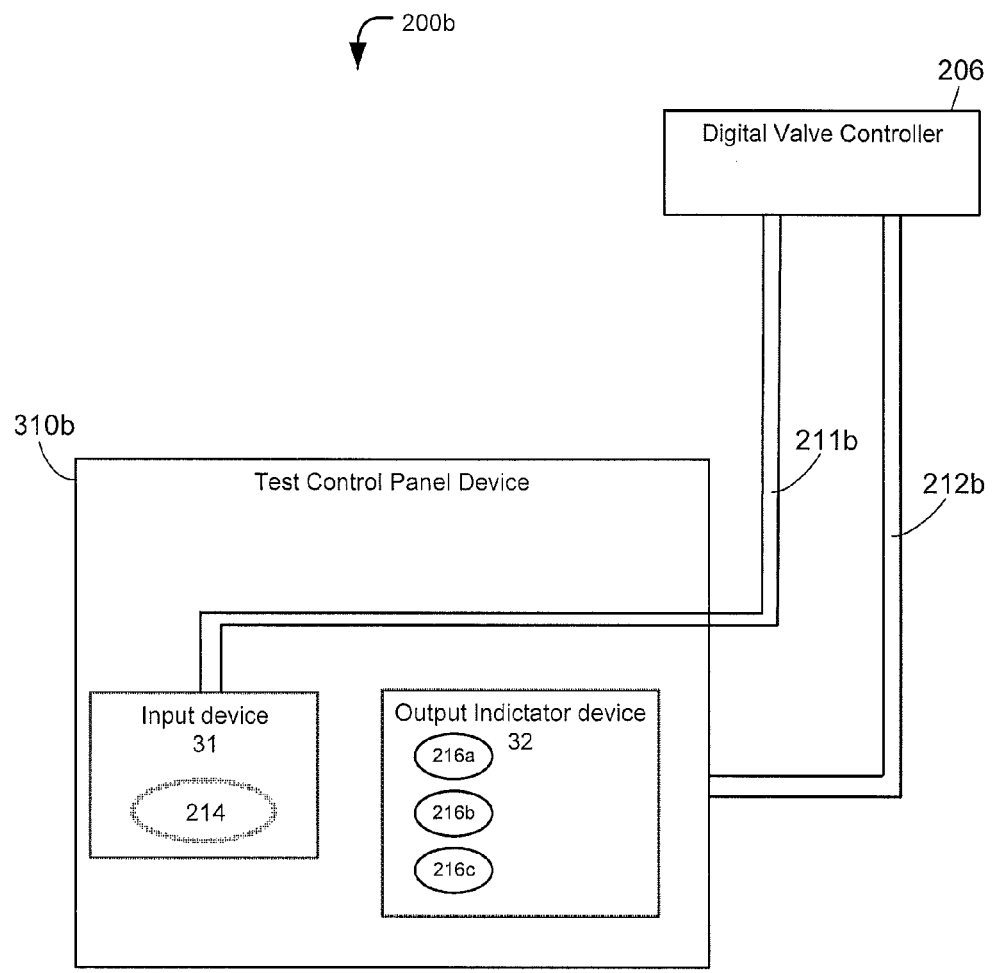
FIG. 3B is another embodiment of a test control panel device that may communicate with a digital valve controller.

FIG. 3A and FIG. 3B illustrate in additional detail two embodiments 310A, 310B, of the test control panel device 310 and the respective systems 200A, 200B in which the embodiments 310A, 310B exist. As illustrated in FIG. 3A, the test control panel device 310A includes an input device 31, an output indicator device 32 having one or more indicators 216, a timer or counter 33, a verification device 34, a transmitter/receiver device 35, memory 36, a processor 37, a test input signal 214, a button 216, an analog/digital converter 38 and a digital/analog converter 39. Of course, the functionality and devices of any features of the test control panel device 310 may be implemented in hardware, firmware, or software, or any combination of the three. Additionally, any of the components of the test control panel device 310 may be distributed to another component of the test control panel system 200, such as a digital valve controller 206.

Operation of one embodiment of the test control panel device 310 is described with reference to FIG. 3A. To initiate the partial stroke test, the user causes the generation of a test indication signal (e.g., by depressing the button 215 on the input device 31). The timer 33 receive the test indication signal and may determine (e.g., by timing or counting) the duration of the test initiation signal. The timer 33 may communicate the determined duration to the verification device 34 to verify that the signal is a valid duration. Alternatively, the timer 33 may communicate the determined duration directly to the processor 37 and/or the memory 36, and the processor 37 may verify that the signal duration is a valid duration. In any event, after the input signal has been determined to have a valid duration, the TX/RX device 35 may communicate the start test signal to the digital valve controller 206 via the communication links 211A, 212A.

FIG. 3B illustrates an alternative embodiment of a test control panel system 200B which includes a test control panel device 310B coupled to the digital valve controller 206 via communication links 211B, 212B. A test control panel device 310B may include input and output components, such as the input device 31 and the output device 32. The test input signal 214 may be an indicator illuminated by a DC signal that is switched on by the push button 215 on the input device 31. Output indicators 216 may be one or more light emitting diodes (LEDs), such as a green LED 216A, a yellow LED 216B, a red LED 216C, etc. One or more of the LEDs 216 may indicate (e.g., by staying on, blinking in a pattern, etc.) that the test control panel device 310A has transmitted the start test signal and/or that the digital valve controller 206 has received the start test signal. Further exemplary indications implementing indicators 216A-C and their signals are described with reference to FIG. 5 and FIG. 6. The remaining components of the test control panel device, illustrated in FIG. 3A as included in the test control panel device 310A (e.g., the D/A converter 39, the processor 37, the verification device 34, the timer/counter 33, the A/D converter 38, the memory 36, the TX/PRESCRIPTION device 35, etc.) are, in the embodiment illustrated in FIG. 3B, included in the digital valve controller 206. Of course, the embodiments of the test control panel systems 200A, 200B may include an analog and/or a digital module that supplies signals to any tested component without requiring communications via the digital valve controller 206.

The operation of the test control panel device 310B is explained below with reference to FIG. 3B. The test control panel device 310B may receive the test input signal 214 from the button 215 on the input device 31. This causes the test control panel device 310B to send a start test signal, such as the start partial stroke test signal, to the digital valve controller 206 via the communication link 211B. After the digital valve controller 206 has monitored for input and received the partial stroke test input signal and, in some embodiments, determined and verified the length of the signal, the digital valve controller 206 sends a pressure signal to the solenoid valve 202. After receiving the pressure signal from the solenoid valve 202, the actuator 204 sends a signal to move the emergency shutdown valve 16 by ramping the emergency shutdown valve 16 from its normal state to a test position and then back again to its normal state.

The digital valve controller 206 may send back a test response signal to the test control panel device 310B via the communication link 212B. A module (not shown) of the digital valve controller 206 may interpret the received test response signal and determine how to indicate the interpreted data to the user via the output indicators 216. Various methods of indicating the interpreted data to the user via the indicators 216 are described with reference to FIG. 5 and FIG. 6.

Figure 4:
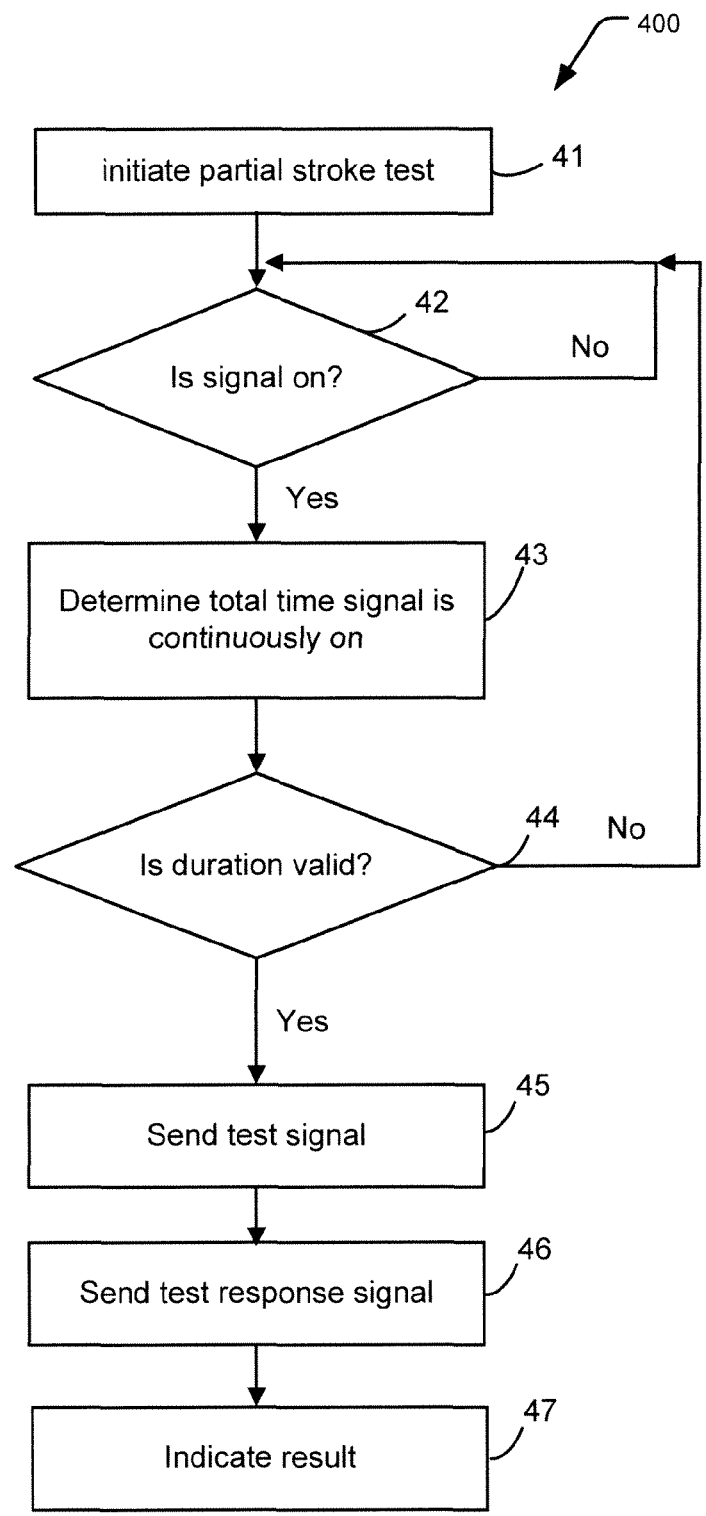
FIG. 4 is a flow diagram of an embodiment of the logic of a test control panel device or system.

FIG. 4 illustrates an embodiment of a method 400 of initiating a test using the test control panel system 200 and indicating a result of an initiated test. The example method 400 may be implemented using the embodiments of system 200 or the test control panel device 310 or any equivalents thereof. The method 400 commences as a user (or the process control system 102) initiates a partial stroke test (block 41) by, for example, sending a start test signal (e.g., by depressing the button 215 on the input device 31). The test control panel system 200 (e.g., at the input device 31) receives the start test signal (block 42) and evaluates (e.g. by the timer 33) the duration of the signal (block 43). Subsequently, the verification device may verify that the determined duration is within a valid range (block 44), such as between 3 and 10 seconds, or any other specified duration. If the duration is valid, the digital test control panel system 200 may send a signal that would facilitate the test (block 45). Following transmission of the signal to facilitate the test, the test control panel system 200 may receive (e.g., from the digital valve controller 206) a test response signal (block 46). Based upon the received test response signal the test control panel system 200 may indicate (e.g., by output indicator devices 216 the received test response signal (block 47), for example, as shown in any of the exemplary embodiments illustrated in FIG. 5 and FIG. 6.

FIG. 5 and FIG. 6 illustrate exemplary embodiments of available test response signals that may be sent by a component used during testing, such as by the digital valve controller 206, to indicate a state of a test, such as a partial stroke test. For example, the index column identifies the number of an exemplary embodiment of response signal and output indication combinations. An embodiment of how these indicators may be used in the field is indicated by the selected combinations. For example a test response signal may be any one or more of the group consisting of: a position sensor signal, a pressure sensor signal, or a current sensor signal or any one or more of the group consisting of: a loop current signal, a travel set point signal, a travel signal, or a DVC startup signal. Any of these signals or a combination of such signals may be used to indicate a test state.

The test state may be indicated by the output indicator 216. For example, output indicator 216 may be any one or more of the group consisting of: a solid green light, a fast green blinking light, a slow green blinking light, a solid red light, a fast red blinking light, a slow red blinking light, solid yellow light, a fast yellow blinking light, or a slow yellow blinking light. In one instance, the output indicator 216 as listed in index 4 of FIG. 5 illustrates a tripped travel set point signal as indicated by a combination of a solid yellow light and a fast blinking green light. The blinking or flashing may include different rates or patterns to distinguish between signals received to show any state of any tested component of the emergency shutdown system 101 or the process plant 100.

The output indicators 216 may indicate to the user various status information determined by interpreting the received test response signal. For example, the information may be information indicating whether a start partial stroke test signal was successfully sent out from the test control panel device 310. The information may be information indicating that the digital valve controller 206 has received the appropriate response signal from the actuator 204. The information may be an indication that the actuator has begun moving the valve 16.

In another embodiment, the output indicator 216 may be used to indicate whether other devices that are further down the line in facilitating communication to the emergency control valve 16, such as a solenoid valve 202 (FIG. 2), an actuator 204 (FIG. 2), or an emergency control valve 16, alone or in combination, have successfully received their respective communication in relation to the user's test initiation input.

The embodiments of the test control panel device 310 and/or the test control panel system 200 described herein may be used for testing (e.g., with a partial stroke test) emergency shutdown systems including an emergency shutdown valve, and for providing an indication of the status or result of the test that was administered to an emergency shutdown valve. As described above, embodiments of the test control panel device 310 and/or the test control panel system 200 described herein may be used for testing any component of an emergency shutdown system 101 or a process plant 100.

Embodiments of the disclosure are not limited to components that are shared and may otherwise include components that make up a redundant emergency shutdown system 101 which includes additional components for shutdown purposes. Embodiments of the disclosure may also include components that are integrated and therefore shared with the process plant 100 rather than being under control of the separate emergency shutdown system 101.

The test control panel system 200 and, in particular, the test control panel device 310, may test any of the components of the process plant 100, including components of the emergency shutdown system 101. The embodiments of test control panel system 200 may include the components of the test control panel device 310, which may be spread across different locations, if beneficial. Examples of the components that may be tested, such as components of the emergency shutdown system 101, include a separate emergency shutdown controller, an impedance booster, a digital communicator, a digital valve controller, a solenoid valve, a valve actuator, feedback signals, or the emergency control valve itself 16.

Some of the disclosed embodiments provide an improvement over the feedback of conventional emergency shutdown systems by including more immediate, more precise, and/or more intuitive feedback indication of the status of the testing being done to a component, such as an emergency shutdown valve 16 which is taking part in a partial stroke test. The benefits of providing improved feedback to a user when running tests improves the efficiency of maintenance operations of the process plant. For example, improved feedback regarding the testing of an emergency system reduces the likelihood of incorrect test interpretation by a test operator. Further, better feedback reduces the down time and problems that result from an incorrectly interpreted test. These problems may be dangerous when for example a partial stroke test result is misinterpreted as indicating a pass, when it actually failed.

Alternative embodiments of the test control panel device 310 or system 200 may include explosion proof or intrinsic safety implementations, or test override modules which are used to override a test if an emergency shutdown command is initiated by process plant 100 or emergency shutdown system 101. For example an explosion proof terminal cover may be used with any component of the test control panel device 310, test control panel system 200.

Some embodiments were made in light of the above noted problems with the conventional art. In accordance with some of the embodiments of the present invention, it is possible to have an improved indication and status of what is occurring with a valve or other components of an emergency shutdown system or process plant after a test, such as a partial stroke test, has been initiated.

What is claimed is:

1. A testing system for testing a valve system including a valve controller, a valve actuator, a solenoid valve, and an emergency shutdown valve, the testing system comprising:
   a test panel including:
      a test input device configured to generate a test input signal;
      a timer for reading a duration of the test input signal;
      a verification device configured to verify that the duration of the test input signal is valid to initiate a test;
      a transmitter device configured to communicate a start test signal to the valve controller in response to a valid duration of the test input signal verified by the verification device and initiate the test to cause the valve controller to proceed with a test routine by controlling the solenoid valve;
   a first output indicator configured to indicate when a valve stroke test start signal was sent from the test panel to the valve controller;
   a receiver device configured to receive signals from the valve controller including one or more of a position sensor signal, a pressure sensor signal, a current sensor signal, a loop current signal, a travel set point signal, a travel signal, and a digital valve controller startup signal provided to the valve controller device during the test by one or more of the valve actuator, the solenoid valve, and the emergency shutdown valve; and
   a second output indicator configured to indicate a state of the test by interpreting the one or more of the position sensor signal, the pressure sensor signal, the current sensor signal, the loop current signal, the travel set point signal, the travel signal, and the digital valve controller startup signal, received from the valve controller, wherein the first output indicator indicates that the valve stroke test start signal was sent independent of the state of the test.

2. The system according to claim 1, wherein at least one of the first or second output indicator is configured to produce an audible or visible indicator.

3. The system according to claim 2, wherein at least one of the first or second output indicator includes a light emitting diode.

4. The system according to claim 2, wherein at least one of the first or second output indicator includes any one or a combination of the following: a green LED, a yellow LED, or a red LED.

5. The system according to claim 1, wherein at least one of the first or second output indicator is configured to cause a light emitter diode (LED) to flash in a pattern.

6. The system according to claim 1, wherein the valve controller signal is generated by the valve controller in response to receiving a feedback signal originated at any of the components of the valve.

7. A computer program product having a non-transitory computer readable medium including programmed instructions for testing a valve system including a valve controller, a valve actuator, a solenoid valve, and an emergency shutdown valve, which when executed by one or more processors, cause the valve system to perform:
   generating, at a test panel, a test input signal;
   reading, at the test panel, a duration of the test input signal;
   verifying, at the test panel, that the duration of the test input signal is valid to initiate a test;
   initiating the test, at the test panel, by sending a start test signal to the valve controller in response to a verified valid duration of the test input signal to cause the valve controller to proceed with a test routine by controlling the solenoid valve;
   indicating, at the test panel, that the test panel has transmitted the start test signal to the valve controller;
   receiving, at the test panel, signals from the valve controller including one or more of a position sensor signal, a pressure sensor signal, a current sensor signal, a loop current signal, a travel set point signal, a travel signal, and a digital valve controller startup signal provided to the valve controller device during the test by one or more of the valve actuator, the solenoid valve, and the emergency shutdown valve; and
   indicating, at the test panel, a state of the test by interpreting the one or more of the position sensor signal, the pressure sensor signal, the current sensor signal, the loop current signal, the travel set point signal, the travel signal, and the digital valve controller startup signal, received from the valve controller, wherein indicating that the test panel has transmitted the start test signal is independent of the state of the test.

8. The computer program product according to claim 7, wherein the indicating a state of the test includes producing an audible or visible indicator.

9. The computer program product according to claim 8, wherein the indicating a state of the test includes causing a light emitter diode (LED) to flash in a pattern.

10. The computer program product according to claim 8, wherein the indicating a state of the test includes using a light emitting diode.

11. The computer program product according to claim 8, wherein the indicating a state of the test includes any one or a combination of the following: lighting a green LED, lighting a yellow LED, or lighting a red LED.

12. The computer program product according to claim 7, wherein receiving signals from the valve controller includes receiving a feedback signal originated at any of the components of the valve.

* * * * *

UNITED STATES PATENT AND TRADEMARK OFFICE
CERTIFICATE OF CORRECTION

PATENT NO. : 9,335,762 B2
APPLICATION NO. : 12/871536
DATED : May 10, 2016
INVENTOR(S) : Kenneth William Junk Page 1 of 1

It is certified that error appears in the above-identified patent and that said Letters Patent is hereby corrected as shown below:

In the Specification

At Column 3, Line 10, "DRAWINGS," should be -- BRIEF DESCRIPTION OF THE DRAWINGS --.

At Column 3, Line 37, "DESCRIPTION," should be -- DETAILED DESCRIPTION --.

At Column 6, Line 23, "shutdown system 200," should be -- shutdown system 101, --.

At Column 7, Lines 19-20, "controller device 206" should be -- controller 206 --.

At Column 8, Line 30, "button 216," should be -- button 215, --.

At Column 9, Line 8, "TX/PRESCRIPTION" should be -- TX/RX --.

At Column 9, Line 60, "216" should be -- 216) --.

Signed and Sealed this
Thirteenth Day of August, 2019

Andrei Iancu
*Director of the United States Patent and Trademark Office*